United States Patent [19]

Kunugi et al.

[11] 3,878,260

[45] Apr. 15, 1975

[54] PROCESS FOR PRODUCING CONJUGATED DIOLEFINS

[75] Inventors: Taiseki Kunugi; Kaoru Fujimoto; Hiroaki Takashima, all of Tokyo, Japan

[73] Assignee: Taiseki Kunugi, Tokyo, Japan

[22] Filed: Aug. 27, 1973

[21] Appl. No.: 391,932

[30] Foreign Application Priority Data

Aug. 30, 1972 Japan.............................. 47-86245

[52] U.S. Cl.............................. 260/680 E; 252/441
[51] Int. Cl................................................ C07c 5/18
[58] Field of Search.......... 260/680 D, 683.3, 680 E

[56] References Cited
UNITED STATES PATENTS

| | | | |
|---|---|---|---|
| 3,156,735 | 11/1964 | Armstrong...................... | 260/680 E |
| 3,205,280 | 9/1965 | Wattimena et al............. | 260/680 D |
| 3,260,767 | 7/1966 | Bajars.............................. | 260/680 D |
| 3,268,612 | 8/1966 | Bajars.............................. | 260/680 D |
| 3,308,188 | 3/1967 | Bajars.............................. | 260/680 D |
| 3,308,193 | 3/1967 | Bajars.............................. | 260/680 D |
| 3,308,198 | 3/1967 | Bajars.............................. | 260/680 D |
| 3,437,703 | 4/1969 | Reitmeier et al................ | 260/680 E |
| 3,439,058 | 4/1969 | Bailey et al. .................... | 260/680 E |

*Primary Examiner*—Paul M. Coughlan, Jr.
*Attorney, Agent, or Firm*—Sherman & Shalloway

[57] ABSTRACT

A process for producing a conjugated diolefin, which comprises reacting a $C_{4-8}$ mono-olefin having a linear chain of at least four carbon atoms with molecular oxygen at an elevated temperature in the presence of a catalyst consisting essentially of (1) a platinum group metal catalyst and (2) a salt of an alkali or alkaline earth metal wherein an anion which constitutes said salt is an inorganic acid radical which contains an element selected from the group consisting of halogen, sulfur, nitrogen, phosphorus and boron.

19 Claims, No Drawings

PROCESS FOR PRODUCING CONJUGATED DIOLEFINS

This invention relates to a process for producing conjugated diolefins. More specifically, the invention relates to a process for producing conjugated diolefins which comprises reacting a $C_{4-8}$ mono-olefin having a linear chain of at least four carbon atoms (to be abbreviated simply to mono-olefin) with molecular oxygen at an elevated temperature in the presence of a catalyst consisting essentially of (1) a platinum group metal catalyst and (2) a salt of an alkali or alkaline earth metal wherein an anion which constitutes said salt is an inorganic acid radical which contains an element selected from the group consisting of halogen, sulfur, nitrogen, phosphorus and boron.

The method involving dehydrogenating $C_4$ to $C_8$ monoolefins such as n-butene or isopentene at elevated temperatures in the presence of molecular oxygen to form the corresponding conjugated diolefins is generally termed an oxidative dehydrogenation method, and as catalysts for use in this method, for example, bismuth molybdate (Ind. & Eng. Chem., Vol. 61, No. 6, p. 30, 1969), Fe-Sb catalyst (Japanese Patent Publication No. 11,095/68), and a platinum group metal catalyst (U.S. Pat. No. 3,439,058) have previously been proposed.

It is an object of this invention to provide a method of producing conjugated diolefins at high selectivities and in high yields by the reaction at low reaction temperatures as a result of discovering a novel effective catalyst for the oxidative dehydrogenation.

It has now been found that a composition composed of a platinum group metal catalyst (to be referred to as a first component) and the above-described salt of an alkali or alkaline earth metal (to be referred to as a second component) is a useful catalyst for the above object of this invention.

By the term "platinum group metal" is meant any of the metals platinum, palladium, rhodium, ruthenium, iridium or osmium. The palladium is especially preferred. The platinum group metal catalyst may be used in the form of an elemental metal or a compound or salt such as palladium chloride or oxide such as palladium oxide. It is preferred to use the platinum group metal catalyst in the form of elemental metal. The most preferred platinum group metal catalyst is metallic palladium.

As examples of metals constituting the salts of the second component, the alkali metal preferably includes lithium, sodium, potassium, rubidium, and cesium, and the alkaline earth metal preferably includes beryllium, magnesium, calcium, strontium, and barium. Anions which constitute the salts used as the second component are inorganic acid radicals which contain an element selected from the group consisting of halogen, sulfur, nitrogen, phosphorus and boron.

In the present invention, the above defined inorganic acid radicals include also the case where each of the aforesaid elements itself constitutes anion. Halogen ion such as alkali or alkaline earth metal halide is an example of such a case.

Anions (inorganic acid radicals) constituting salts of the second component include halogen ion such as $F^-$, $Cl^-$, $Br^-$ and $I^-$; oxy acid ion of halogen such as $ClO^-$, $ClO_2^-$, $ClO_3^-$, $BrO^-$ and $BrO_3^-$; oxy acid ion of sulfur such as $SO_3^{--}$, $SO_4^{--}$ and $S_2O_7^{--}$; oxy acid ion of nitrogen such as $NO_3^-$ and $NO_2^-$; oxy acid ion of phosphorus such as $PO_3^-$, $P_2O_7^{----}$, $PO_4^{---}$, $HPO_4^{--}$, $H_2PO_4^-$ and $PO_4^{---}$; oxy acid ion of boron such as $BO_3^{---}$; and $CN^-$. The preferred second component is an alkali or alkaline earth metal halide, especially preferably chloride or bromide.

The amount of the second component in the catalyst of this invention is 10 g-equivalents or less, preferably 0.1 to 8 g-equivalents per gram-atom of the metallic element of the first component.

The catalyst of this invention is characterized by a combination of the first and second components described above. The presence of the second component gives rise to the following advantages in an oxidative dehydrogenation reaction.

1. The rate of the oxidative dehydrogenation is markedly promoted at a temperature of 200°C. or above.
2. The selectivity to a conjugated diolefin is remarkedly increased.
3. The isomerization of the double bond is greatly inhibited. 4. The formation of carbon dioxide is extremely reduced.

The preferred starting substance of the first component in the preparation of the catalyst used in this invention is a substance which is easy to deposit on a carrier and to convert to the metal, preferably halides, acetates, and oxides.

Whilst the catalyst can be used as such, it is preferred to use it after depositing on a support such as silica gel, porous glass, activated alumina, zeolite or activated carbon.

The method for preparing the catalyst deposited on a support for use in the present invention may be varied according to the characteristics of the starting material for the first component, the characteristics of the second component, the interaction between the two thereof, and the amount of these components to be deposited on the support. However, when the first component is a salt of the platinum group metal, the method for the catalyst preparation is generally simple. The catalyst can be simply prepared by impregnating a support with an aqueous solution containing a salt of a platinum group metal and a salt of an alkali or alkaline earth metal and then drying it, or evaporating a mixture of the said aqueous solution and the support to dryness. A catalyst in which the first component is an elemental metal is prepared by subjecting to a reducing treatment the catalyst obtained above in which the salt of the platinum group metal and the salt of the alkali or alkaline earth metal are deposited on a support, thereby reducing the salt of platinum group metal; or by preparing a catalyst in which the platinum group metal salt is deposited on a support from the aqueous solution of the platinum group metal salt and the support, reducing the resulting catalyst, and then putting into an aqueous solution of an alkali or alkaline earth metal salt, and evaporating the solution to dryness. The deposition of the platinum group metal on the support can also be performed by the vacuum evaporation method.

The reduction of the platinum group metal salt is effectively carried out, for example, by treating with hydrogen, hydrocarbon gas, formaldehyde, or hydrazine. Reduction with hydrogen is simple in operation and the reduction product has superior catalytic activity. Accordingly, it is the most commonly practised method. The operation involves heating the material for 3 to 8 hours in a stream of hydrogen at 300° to 500°C. and in other cases, the unreduced catalyst is packed into the reactor and reduced, while operating the oxidative dehydrogenation reaction, to induce the activity of the catalyst.

The amount of the first component to be deposited on a support is 0.1 to 15 % by weight, preferably 0.3 to 5 % by weight. If the amount is less than 0.1 % by weight, the activity of the resulting catalyst is too low, and the efficiency is poor. If it is above 5 % by weight, the selectivity for carbon dioxide formed becomes too high.

The amount of the second component is determined according to the amount of the first component described above.

In the performance of the reaction in accordance with the present invention, either oxygen as such or air can be used as a source of molecular oxygen. An inert diluent gas, for example nitrogen, argon, helium or saturated hydrocarbon may also be introduced into the reaction zone.

The reaction temperature employed in this invention is 150° to 400°C., preferably 170° to 330°C. If the reaction temperature is less than 150°C., the rate of reaction is too low and, thus, undesirable. If it is above 400°C., the production of carbon dioxide formed becomes exceedingly large, and the selectivity to diolefins is reduced.

The reaction pressure may be from a reduced pressure lower than atmospheric pressure to a superatmospheric pressure, of up to 50 atms, and preferably 0.5 to 25 atms. The space velocity ranges from 1,000 to 10,000 hr$^{-1}$, in other words (W/F) 30 — 3 g-cat hr/g-mol (on the basis of 0°C. and 1 atm.).

The ratio of an olefin in the feed gas is 2 % to 95 %, preferably 5 % to 90 %, when the reaction is performed in the vapor phase. If it is less than 2 %, the space time yield becomes too low, and this is of course disadvantageous. If it is above 95 %, the conversion of an olefin per pass is too low and the space time yield is low. Generally, however, the proportion of carbon dioxide to be formed is reduced with higher olefin content, and therefore, it is preferred to increase the ratio of the olefin.

The preferred ratio of molecular oxygen in the feed gas is 2 % to 70 %. If it is less than 2 %, the amount of an internal mono-olefin formed by isomerization increases, and the yield of the diolefin becomes too low. If it is above 70 %, the ratio of carbon dioxide formed increases remarkably.

When steam is introduced into the reaction zone, the preferred ratio of steam in the feed gas is not more than 90 %. Larger proportions of steam are advantageous for the formation of diolefins, but if it is more than 90 %, the space time yield becomes remarkably small.

The starting mono-olefin usable in the reaction of this invention is one having four to eight carbon atoms, especially preferably 1-butene, 2-butene, 1-pentene, i-pentene, 1-hexane, i-hexane, 2,3-dimethylpentene, 1-octene, etc. 1,3-butadiene is obtained from n-butenes; isoprene from i-pentene; 2,3-dimethylbutadiene from 2,3-dimethylbutene, and linear diolefins from linear 1-olefins. The 1-olefins (or $\alpha$-olefins) have somewhat greater reactivity than the internal olefins.

The process of the present invention is usually carried out in the vapor phase. If the present invention is performed in the liquid phase, the reaction system is maintained in the liquid phase, for example, by elevating the pressure in the presence or absence of a solvent which is an oxidation-proof solvent such as benzene, acetone and water, and the fine powders of the catalyst are suspended in the liquid, and a gas containing molecular oxygen is introduced into the reaction system. Generally, the vapor phase reaction is easier to carry out. The form of the reactor may be any of those which are conventional such as the fluidized, moving or fixed bed type.

The following non-limitative Examples illustrate the present invention.

EXAMPLE 1

Palladium chloride, rhodium chloride, platinum chloride, irridium chloride or ruthenium chloride was dissolved in dilute hydrochloric acid (0.05N) to form a 0.1 % solution. Activated carbon (surface area 1,330 m$^2$/g, made from charcoal) was put into this solution and allowed to stand for 24 hours. Then, the mixture was evaporated to dryness. The amount of each of the above salts deposited on activated carbon was 1 % by weight calculated as elemental metal. The dried product was then reduced in a stream of hydrogen at 300°C. to convert the salt to metal. The activated carbon supporting the metal was placed in a 0.1 % solution chloride, and the mixture was evaporated to dryness. The amount of sodium chloride deposited on the activated carbon was 1-gram-equivalent per gram-atom of the metal of the first component.

A hard glass reaction tube with an inside diameter of 16 mm was packed with the above catalyst, and a gaseous mixture consisting of 1-butene, oxygen, and steam in a molar ratio of 4:1:6 was passed therethrough at a temperature of 200°C. at 7.5 g-cat hr/g-mol (W/F). In 1 hour after the initiation of reaction, the reaction reached steady state, and the products were butadiene, trans-2-butene, cis-2-butene and carbon dioxide. The one pass yields of the products based on 1-butene fed are shown in Table 1.

For comparison, the above procedure was repeated except that the second component was not deposited on the support. The results are also shown in Table 1 as Control.

Table 1

| Runs Nos. | Catalyst | | Yields (mol%) | | | |
|---|---|---|---|---|---|---|
| | 1st Component | 2nd Component | Buta-diene | Trans-2-butene | Cis-2-butene | Carbon dioxide |
| 1 | Palladium | Sodium chloride | 10.7 | 0.9 | 0.8 | 0.07 |
| 2 | Rhodium | " | 6.1 | 3.3 | 3.0 | 0.06 |
| 3 | Platinum | " | 2.6 | 3.8 | 2.9 | 1.21 |
| 4 | Iridium | " | 2.4 | 2.2 | 1.9 | 0.84 |
| 5 | Ruthenium [Control] | " | 1.7 | 0.3 | 0.2 | 0.13 |

Table 1—Continued

| Runs Nos. | Catalyst 1st Component | 2nd Component | Yields (mol%) Butadiene | Trans-2-butene | Cis-2-butene | Carbon dioxide |
|---|---|---|---|---|---|---|
| 6 | Palladium | none | 4.8 | 2.3 | 1.7 | 0.26 |
| 7 | Rhodium | " | 3.5 | 10.5 | 8.6 | 0.22 |
| 8 | Platinum | " | 1.1 | 15.2 | 11.3 | 9.95 |
| 9 | Iridium | " | 0.9 | 15.6 | 14.7 | 1.01 |
| 10 | Ruthenium | " | 0.8 | 1.5 | 0.8 | 0.14 |

EXAMPLE 2

In the same way as in Example 1, 1 % by weight of metallic palladium as the first component was deposited on silica gel having a surface area of 480 m$^2$/g, and then further, each of the second components shown in Table 2 was deposited in an amount of 1-gram-equivalent per gram-atom of metallic palladium. By the same method as in Example 1, the oxidative dehydrogenation reaction of 1-butene was performed. The one pass yields based on 1-butene fed are shown in Table 2.

Table 2

| Runs Nos. | 2nd Component of catalyst | Yields (mol%) Butadiene | Trans-2-butene | Cis-2-butene | Carbon dioxide |
|---|---|---|---|---|---|
| | [This invention] | | | | |
| 1 | LiCl | 18.7 | 3.6 | 3.1 | 0.06 |
| 2 | NaCl | 17.7 | 2.7 | 2.3 | 0.11 |
| 3 | KCl | 17.8 | 2.0 | 1.9 | 0.10 |
| 4 | RbCl | 16.4 | 2.1 | 1.5 | 0.10 |
| 5 | CsCl | 15.8 | 2.0 | 1.2 | 0.11 |
| 6 | BeCl$_2$ | 12.3 | 6.2 | 6.5 | 0.10 |
| 7 | MgCl$_2$ | 11.8 | 6.5 | 6.7 | 0.09 |
| 8 | CaCl$_2$ | 13.6 | 5.7 | 5.1 | 0.10 |
| 9 | SrCl$_2$ | 11.1 | 6.0 | 5.9 | 0.13 |
| 10 | BaCl$_2$ | 13.0 | 5.5 | 5.2 | 0.11 |
| | [Control] | | | | |
| 11 | none | 9.4 | 18.6 | 18.1 | 2.8 |
| 12 | AlCl$_3$ | 2.4 | 22.7 | 25.3 | 0.75 |

EXAMPLE 3

By the same way as in Example 1, 1 % by weight of metallic palladium as the first component was deposited on silica gel having a surface area of 480 m$^2$/g, and further, each of the second components shown in Table 3 was deposited thereon in an amount of 1 gram-equivalent per gram-atom of the metallic palladium. By the same way as in Example 1, the oxidative dehydrogenation of 1-butene was carried out. The one pass yields based on 1-butene fed are shown in Table 3.

Table 3

| Runs Nos. | 2nd Component of the catalyst | Yields (mol%) Butadiene | Trans-2-butene | Cis-2-butene | Carbon dioxide |
|---|---|---|---|---|---|
| | [This invention] | | | | |
| 1 | NaF | 17.5 | 4.3 | 3.3 | 0.7 |
| 2 | NaBr | 12.7 | 6.4 | 6.2 | 0.01 |
| 3 | NaI | 10.5 | 0.7 | 0.8 | 0.01 |
| 4 | Na$_2$SO$_4$ | 21.7 | 12.8 | 8.3 | 1.8 |
| 5 | NaNO$_3$ | 24.6 | 6.1 | 4.8 | 2.0 |
| 6 | Na$_2$HPO$_4$ | 29.9 | 9.3 | 7.6 | 1.7 |
| 7 | NaCN | 22.3 | 5.1 | 4.0 | 5.0 |
| | [Control] | | | | |
| 8 | none | 9.4 | 18.6 | 18.1 | 2.8 |
| 9 | NaOH | 25.5 | 11.7 | 8.6 | 3.6 |
| 10 | H$_2$SO$_4$ | 11.5 | 18.6 | 20.5 | 2.7 |
| 11 | HCl* | 1.4 | 12.9 | 13.6 | 0.01 |

*Partial pressure of HCl is 0.01 ata.

EXAMPLE 4

By the same method as in Example 1, 1 % by weight of metallic palladium as the first component was deposited on silica gel having a surface area of 480 m$^2$/g, and further, sodium chloride as the second component was deposited in various proportions. The proportion of sodium chloride deposited is shown by the number of gram-equivalents per gram-atom of the metallic palladium as shown in Table 4.

The oxidative dehydrogenation of 1-butene was carried out by the same method as in Example 1. The one pass yields of the products based on 1-butene fed are shown in Table 4.

Table 4

| Runs Nos. | Sodium chloride | Yields (mol%) Butadiene | Trans-2-butene | Cis-2-butene | Carbon dioxide |
|---|---|---|---|---|---|
| 1 | 0 | 9.4 | 18.6 | 18.1 | 2.8 |
| 2 | 0.25 | 23.5 | 6.4 | 5.6 | 0.4 |
| 3 | 2.0 | 22.0 | 3.6 | 3.1 | 0.1 |
| 4 | 6.0 | 20.4 | 4.9 | 4.2 | 0.3 |
| 5 | 10.0 | 9.8 | 1.0 | 0.9 | 0.5 |

EXAMPLE 5

By the same way as in Example 1, 1 % by weight of metallic palladium as the first component was deposited on silica gel having a surface area of 480 m$^2$/g, and sodium chloride as the second component was deposited thereon in an amount of 6 gram-equivalents per gram-atom of the metallic palladium.

By the same way as in Example 1, the oxidative dehydrogenation of 1-butene was carried out at various reaction temperatures. The one pass yields of the products based on 1-butene fed are shown in Table 5.

Table 5

| Runs Nos. | Reaction temperature (°C.) | Yields (mol%) Butadiene | Trans-2-butene | Cis-2-butene | Carbon dioxide |
|---|---|---|---|---|---|
| 1 | 150 | 2.7 | 1.1 | 0.9 | 0.1 |
| 2 | 170 | 4.4 | 1.1 | 0.8 | 0.1 |

Table 5—Continued

| Runs Nos. | Reaction temperature (°C.) | Yields (mol%) | | | |
|---|---|---|---|---|---|
| | | Butadiene | Trans-2-butene | Cis-2-butene | Carbon dioxide |
| 3 | 230 | 16.3 | 1.7 | 1.3 | 0.6 |
| 4 | 280 | 26.3 | 2.6 | 2.4 | 2.1 |
| 5 | 340 | 25.1 | 5.7 | 5.5 | 8.3 |
| 6 | 410 | 15.6 | 8.0 | 7.7 | 19.4 |

EXAMPLE 6

A porous glass having a surface area of 1.520 m²/g was put into a 0.1 % aqueous solution of $K_2PdCl_4$, and the mixture was evaporated to dryness. The amount of $K_2PdCl_4$ deposited on the support was 2.1 % by weight. $K_2PdCl_4$ on the support was reduced at 400°C. in a stream of hydrogen until the flowing of chlorine ions was stopped. Then, by the same method as in Example 1, sodium phosphate ($Na_2HPO_4$) was additionally deposited thereon in an amount of 0.4 gram-equivalent per gram-atom of the metallic palladium.

The metallic palladium-potassium chloride-sodium phosphate catalyst deposited on the porous glass as obtained in this manner was packed into the same reaction apparatus as used in Example 1, and a gaseous mixture consisting of an olefin (shown in Table 6), air and steam in a molar ratio of 2:5:5 was passed through the reaction apparatus at a temperature of 260°C. with 7.5 g-cat hr/g-mol (W/F). The one pass yields of the products based on the starting olefin are shown in Table 6.

Table 6

| Runs Nos. | Olefins | Yields (mol%) | | |
|---|---|---|---|---|
| | | Diolefin | Isomerized mono-olefin | Carbon dioxide |
| 1 | 1-Butene | 42.1 | 3.6 | 1.7 |
| 2 | cis-2-Butene | 20.7 | 4.4 | 1.8 |
| 3 | 2-Methyl-3-butene | 13.3 | 5.8 | 2.4 |
| 4 | 1-Hexene | 26.6 | 3.3 | 1.9 |
| 5 | 1-Octene | 23.5 | 3.9 | 1.8 |

What we claim is:

1. A process for producing a conjugated diolefin, which comprises reacting a first reactant consisting essentially of a $C_{4-8}$ mono-olefin having a linear chain of at least four carbon atoms with a second reactant consisting essentially of molecular oxygen at a temperature of 170°C. – 330°C. in the presence of a catalyst consisting essentially of (1) a platinum group metal catalyst and (2) a salt of an alkali or alkaline earth metal wherein an anion which constitutes said salt is an inorganic acid radical which contains an element selected from the group consisting of halogen, sulfur, nitrogen, phosphorus and boron.

2. The process of claim 1, wherein the amount of the salt of alkali or alkaline earth metal is 0.1 – 8 g-equivalent per gram-atom of metallic element of the platinum group metal catalyst.

3. The process of claim 1, wherein the reaction is carried out in the vapor phase.

4. The process of claim 3, wherein the amount of salt of the alkali or alkaline earth metal is 0.1 – 8 g-equivalent per gram-atom of metallic element of the platinum group metal catalyst.

5. The process of claim 3, wherein the source of molecular oxygen is air.

6. The process of claim 3, wherein an inert gas is introduced into the reaction zone.

7. The process of claim 3, wherein steam is introduced into the reaction zone.

8. The process of claim 3, wherein the catalyst is deposited on a support.

9. The process of claim 3, wherein the platinum group metal catalyst is used in the form of elemental metal.

10. The process of claim 9, wherein the platinum group metal catalyst is metallic palladium.

11. The process of claim 3, wherein the platinum group metal catalyst is used in the form of a compound of the metal.

12. The process of claim 3, wherein the salt of the alkali or alkaline earth metal is an alkali or alkaline earth metal halide.

13. The process of claim 12, wherein the salt of alkali or alkaline earth metal halide is an alkali or alkaline earth metal chloride or bromide.

14. The process of claim 3, wherein the platinum group metal catalyst is metallic palladium, and the salt of an alkali or alkaline earth metal is an alkali or alkaline earth metal chloride or bromide.

15. The process of claim 13, wherein the catalyst is deposited on a support.

16. The process of claim 3, wherein the mono-olefin is n-butene or isopentene.

17. The process of claim 1, wherein the reaction is carried out in the liquid phase.

18. The process of claim 3, wherein the proportions of the mono-olefin and molecular oxygen, on a molar basis, are:

| Mono-olefin | 5 – 90% |
|---|---|
| Molecular oxygen | 2 – 70%. |

19. The process of claim 7, wherein the proportions of the mono-olefin, molecular oxygen, and steam, on a molar basis, are:

| Mono-olefin | 5 – 90% |
|---|---|
| Molecular oxygen | 2 – 70% |
| Steam | not more than 90%. |

* * * * *